United States Patent [19]
Kruckman

[11] Patent Number: 6,036,600
[45] Date of Patent: Mar. 14, 2000

[54] COMBINE DUST ELIMINATOR

[76] Inventor: Harold D. Kruckman, 232 Laurel Ave., Hazel Run, Minn. 56241-3010

[21] Appl. No.: 09/153,963

[22] Filed: Sep. 16, 1998

Related U.S. Application Data

[60] Provisional application No. 60/087,639, Jun. 2, 1998.

[51] Int. Cl.⁷ .................................................. A01F 12/54
[52] U.S. Cl. ............................................................ 460/117
[58] Field of Search ............................. 460/70, 114, 116, 460/117; 56/16.4 R, 219, 12.8; 474/84, 86, 88, 148, 150, 159

[56] References Cited

U.S. PATENT DOCUMENTS

| | | |
|---|---|---|
| Re. 32,679 | 5/1988 | Brooks . |
| 882,977 | 3/1908 | Sylvester .................................. 460/119 |
| 1,096,428 | 5/1914 | Holley ..................................... 460/119 |
| 1,835,327 | 12/1931 | Paradise .............................. 460/114 X |
| 2,706,371 | 4/1955 | Bishop . |
| 3,094,829 | 6/1963 | Claas .................................... 460/117 X |
| 3,129,601 | 4/1964 | Edwards ................................ 474/88 X |
| 3,213,598 | 10/1965 | Olsson . |
| 3,226,918 | 1/1966 | Jarvis . |
| 4,377,260 | 3/1983 | Huffman .............................. 241/101.2 |
| 4,583,354 | 4/1986 | Kracl ........................................ 56/16.6 |
| 4,970,849 | 11/1990 | Friesen . |
| 5,001,893 | 3/1991 | Stanley et al. .......................... 56/328.1 |
| 5,373,688 | 12/1994 | Stanley et al. . |
| 5,518,453 | 5/1996 | Tribbett ....................................... 460/1 |
| 5,595,537 | 1/1997 | Jungemann et al. . |

OTHER PUBLICATIONS

Article entitled "Inventor makes a combine vacuum to trap dust", The Land, Friday, Sep. 12, 1997—p. 15.
E–Z View Combine Dust Eliminator, Clear Vision, Inc.

*Primary Examiner*—James A. Lisehora
*Attorney, Agent, or Firm*—Nelson R. Capes; Mackall, Crounse & Moore, PLC

[57] ABSTRACT

A combine dust eliminator attachable to the feeder housing of a John Deere carbine consists of an elongate dust eliminator housing having a pair of dust discharge chutes at either end. The dust discharge chutes are swingably mounted on the dust eliminator housing and may be swung upwards toward the center of the dust eliminator housing for access to internal parts. Mounted on each dust discharge chute is a dust curtain which hangs downwardly outside the sides of the combine feeder housing. The dust eliminator housing is swingably mounted to the top surface of the combine feeder housing and tilts upwardly and forwardly to allow access to the combine feeder housing. Locking devices hold the dust eliminator housing in horizontal contact with the feeder housing while in operation. Within the dust eliminator housing is a shaft having a driven rotating fan at each end, near the dust discharge chutes. The shaft is driven by any power takeoff on the combine, but in the most preferred embodiment it is driven by the combine drive chain board on the feeder housing, through a belt and pulley.

18 Claims, 4 Drawing Sheets

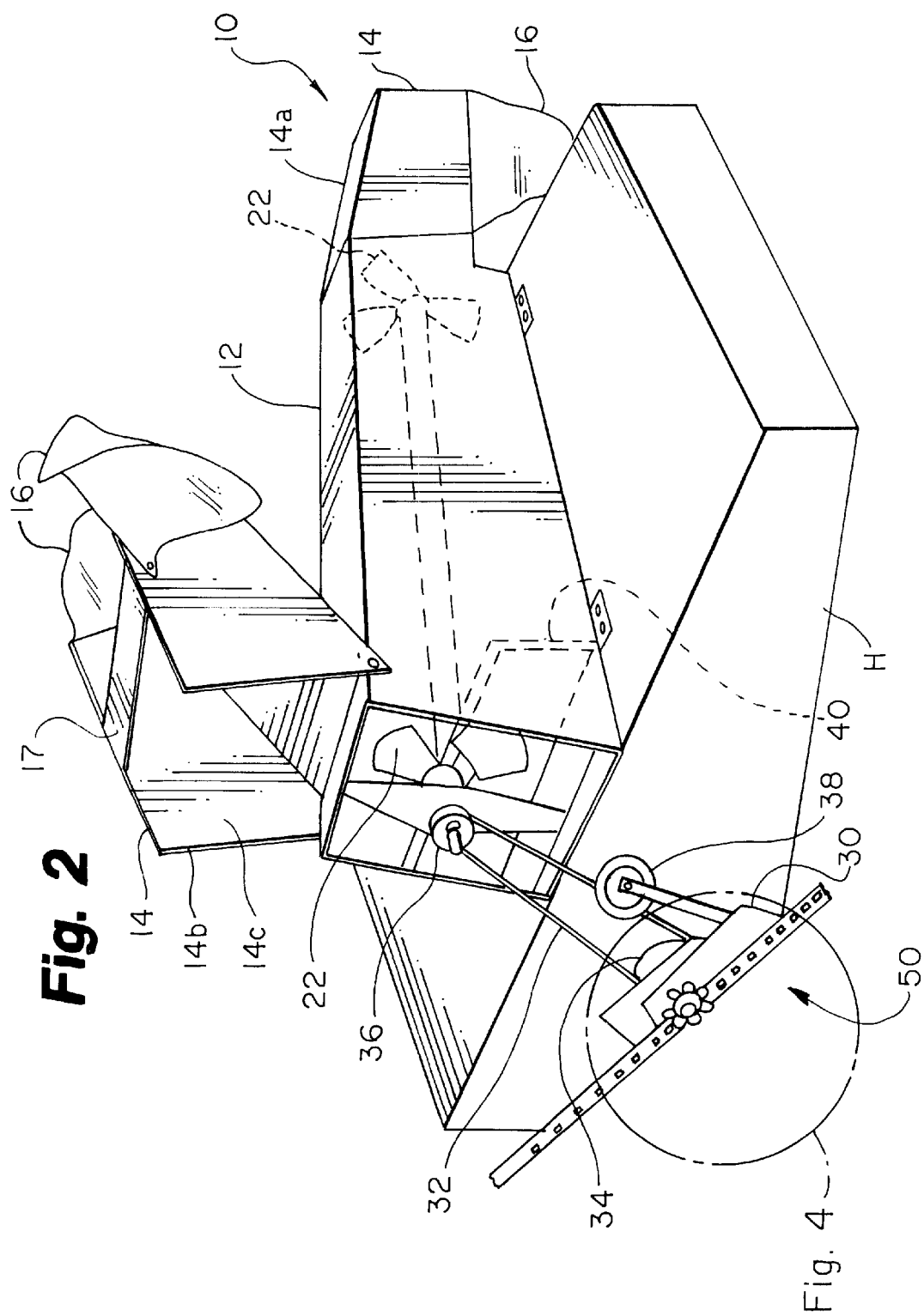

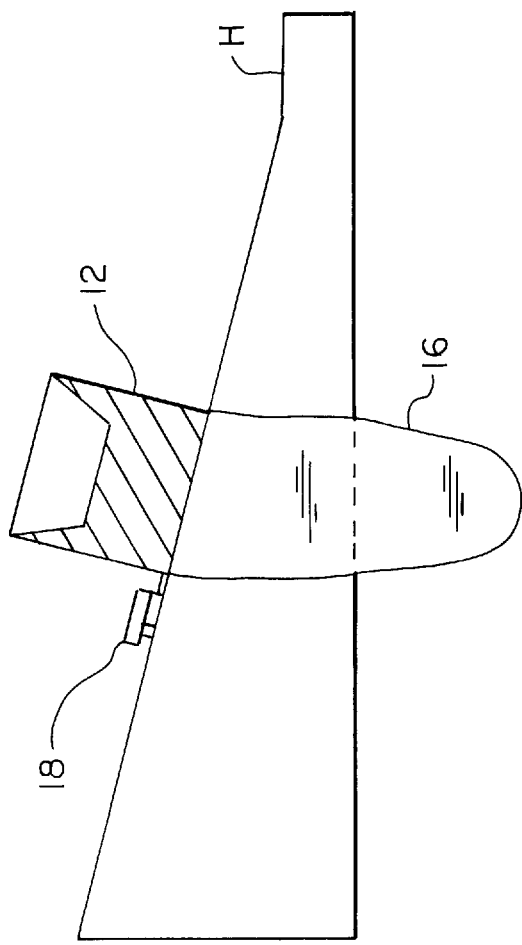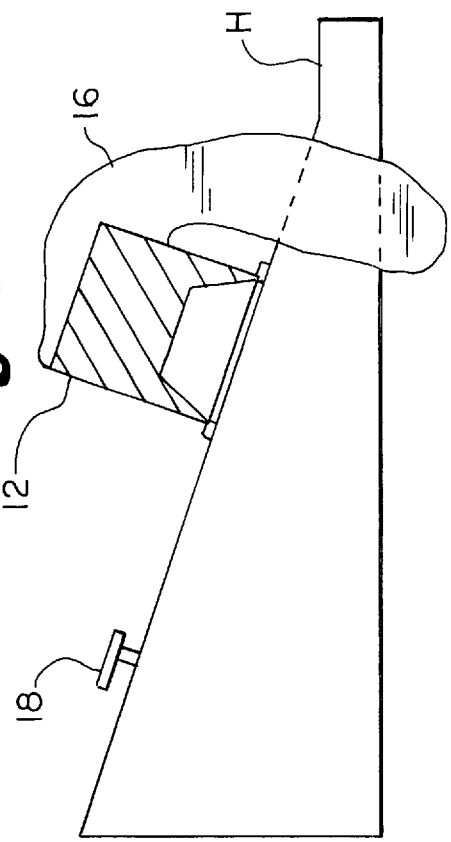

COMBINE DUST ELIMINATOR

This is a non-provisional application which claims the benefit of prior filed co-pending provisional application No. 60/087,639, filed Jun. 2, 1998.

BACKGROUND OF THE INVENTION

This invention relates to a dust eliminator for a combine, and more particularly to a dust eliminator that mounts to the feeder housing of a John Deere combine.

The hazards to health and good vision of the operator of a combine are well known to those who have utilized or seen such equipment harvesting and threshing grain in a field. The grain must be fairly dry before this operation can be commenced, or else a pasty material can be produced as the combine moves through the field. However, when the grain is sufficiently dried to afford the proper conditions for harvesting and threshing, an appreciable quantity of dust is produced as the grain is cut or picked up from the windrows, fed through an undershot conveyor to the thresher, and then processed between the cylinder and the concave. This dust interferes with the vision of the operator, often resulting in the operator driving the feeder housing over rocks, which enter the housing and cause damage to the equipment. The dust may also adversely affect the health of the operator, as the operator breathes in large quantities of dust throughout the day.

Earlier dust eliminators were hydraulically or electrically driven, resulting in difficulty in incorporation into existing harvesters and expensive operation. Other earlier dust eliminators required a special housing to be incorporated in the combine feeder housing for attachment of the dust eliminator. When these dust eliminators were in place, the feeder housing could not be inspected.

There is a need for a combine dust eliminator which eliminates the above problems of earlier dust eliminators. In particular, there is a need for a combine dust eliminator attachable to the feeder housing of a John Deere combine without modifying the feeder housing, and which can be easily tilted upward for inspection of the feeder housing through the inspection ports.

SUMMARY OF THE INVENTION

A combine dust eliminator attachable to the feeder housing of a combine consists of an elongate dust eliminator housing having a pair of dust discharge chutes at either end. The dust discharge chutes are swingably mounted on the dust eliminator housing and may be swung upwards toward the center of the dust eliminator housing for access to internal parts. Mounted on each dust discharge chute is a dust curtain which hangs downwardly outside the sides of the combine feeder housing.

The dust eliminator housing is swingably mounted to the top surface of the combine feeder housing and tilts upwardly and forwardly to allow access to the combine feeder housing. Locking devices hold the dust eliminator housing in horizontal contact with the feeder housing while in operation. Within the dust eliminator housing is a shaft having a driven rotating fan at each end, near the dust discharge chutes. The shaft is driven by any power takeoff on the combine, but in the most preferred embodiment it is driven by the combine drive chain board on the feeder housing, through a belt and pulley.

A principal object and advantage of the present invention is that it operates off any power takeoff on a combine, without the need for hydraulic or electric power.

Another principal object and advantage of the present invention is that it can be mounted to the feeder housing of any model John Deere combine without modifying the combine.

Another principal object and advantage of the present invention is that it eliminates essentially all dust from the crop being processed through the feeder housing.

Another principal object and advantage of the present invention is that by eliminating dust it allows the operator to see where the combine is going and thus avoid obstacles such as rocks being sucked into the combine.

Another principal object and advantage of the present invention is that it reduces the hazards to an operator's health caused by breathing dust all day long.

Another principal object and advantage of the present invention is that it reduces down-time on the combine by reducing the possibility of damaging objects such as rocks being sucked into the combine and by reducing wear-and-tear on the combine's inner parts caused by dust.

Another principal object and advantage of the present invention is that it is easily installable on the combine's feeder housing.

Another principal object and advantage of the present invention is that is tiltable so that the feeder housing can be inspected through the feeder housing's inspection ports.

BRIEF DESCRIPTION OF THE DRAWINGS

FIG. 2 is a perspective view of the combine dust eliminator of the present invention in place on the feeder housing of a combine, with one of the dust discharge chutes tilted open for access to internal parts. Internal structure of the dust eliminator is shown in phantom.

FIG. 3A is a side elevational view of the combine dust eliminator of the present invention in place on the feeder housing of a combine.

FIG. 3B is similar to FIG. 3A, except that the combine dust eliminator has been tilted forward to allow access to the feeder housing through the inspection ports.

DETAILED DESCRIPTION OF THE PREFERRED EMBODIMENTS

Figure 1:
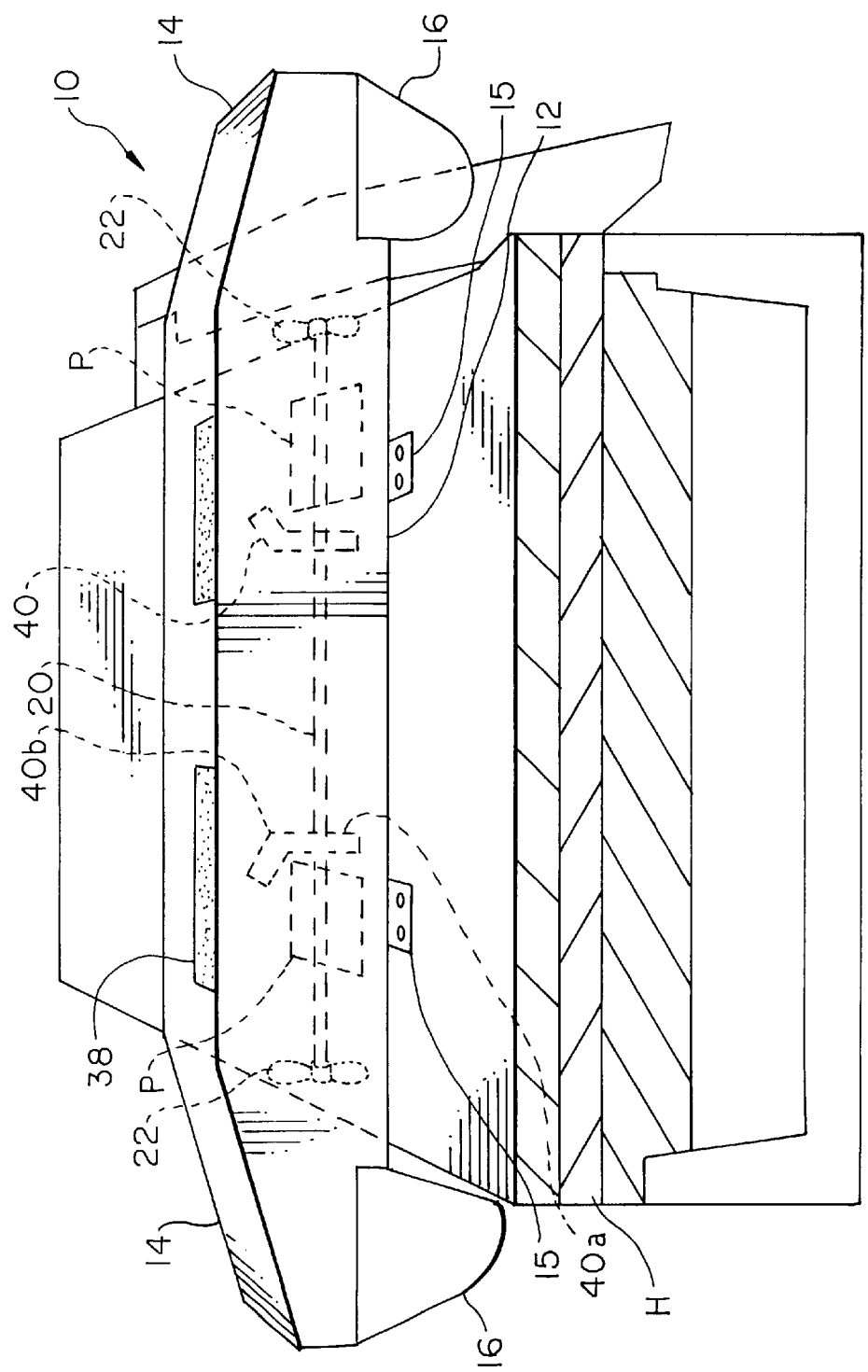
FIG. 1 is a perspective view of the combine dust eliminator of the present invention in place on the feeder housing of a combine. The inspection ports of the combine feeder housing and doors are shown in phantom (the doors are removed when the dust eliminator is mounted).

A combine dust eliminator of the present invention is generally shown in the Figures as reference numeral 10.

The combine dust eliminator 10 comprises an elongate dust eliminator housing 12. The dust eliminator housing 12 is adapted to be attached to the feeder housing H of a combine, such as a John Deere combine.

The combine dust eliminator 10 further comprises a plurality of dust discharge chutes 14 attached to the dust eliminator housing 12. Preferably, a pair of dust discharge chutes 14 mounted at either end of the dust eliminator housing 12. Preferably, the dust discharge chutes 14 are swingably mounted on the dust eliminator housing 12 and may be swung upwards (as shown in FIG. 2) toward the center of the dust eliminator housing 12 for access to internal parts.

Mounted on each dust discharge chute 14 is a dust curtain 16 which hangs downwardly outside the sides of the combine feeder housing H.

The dust eliminator housing 12 may be swingably mounted on the top surface of the combine feeder housing H and tilts upwardly and forwardly to allow access to the combine feeder housing H though inspection ports P.

Locking devices 18 hold the dust eliminator housing 12 in horizontal contact with the combine feeder housing H while in operation.

Within the dust eliminator housing 12 is a shaft 20 having a driven rotating fan 22 at each end, near the dust discharge chutes 14. The shaft 20 may be driven by any power takeoff on the combine, as will be discussed below.

The unit sits on top the feeder house H of a combine such as a John Deere Combine. The feeder house H is mounted behind the header attachment. It has a chain inside that is designed to take the grain into the cylinder and concave. The feeder house has inspection covers that are removed when the combine dust eliminator is installed. This allows the dust to come into the unit. The older units (model combine) have one solid cover to be removed. The same type installation of unit. FIG. 1 shows the unit resting on the feeder house. It has two hinges 15 on the front to allow for hinging forward for inspection through the hole(s) P. There are two bolt lock devices 18 on the rear of the unit to lock down from tipping forward while operating. These screw to the feeder house, not the unit.

The rotating fans 22 further comprise two 4-blade fans 22, rated at 1550 C.F.M. each. They are opposite (one right and one left), or clockwise, counterclockwise. That is, the blade pitch of the two fans is opposite, one fan having a left blade pitch and the other fan having a right blade pitch, so that when the fans 22 are rotated in the same direction by the shaft 20 they move air in opposed directions, that is, toward the outside of the dust eliminator housing 12, away from the inspection ports P. The fans 22 are mounted on each end of the shaft 20.

The combine dust eliminator 10 further comprises a plurality of baffles 40 within the dust eliminator housing 12, the baffles 40 separating the respective air flows of the fans 22. Preferably, there are two baffles 40 inside a unit for support to stand on and for airflow. The baffles 40 may illustratively be mounted inboard of inspection ports P, approximately 19" from the ends of dust eliminator housing 12. The baffles 40 preferably further comprise a first portion 40a extending from the feeder housing H upwardly for approximately half the depth of the dust eliminator housing 12, and a second portion 40b connected to the first portion 40a and angled outwardly at about a 45 degree angle to an axis of the dust eliminator housing 12, for maximum airflow. They also have an oil lyte bearing in them for supporting the shaft 20.

The shaft 20 may illustratively be a ⅝" diameter with a key slot cut on the drive end for a 2½" drive pulley 36. There are self-centering bearings on both ends of the unit center for support (flange type).

The dust discharge chutes 14 are designed to seal against the dust eliminator housing 12 as the chute closes. They are to go over center when it is lifted up so they rest by themselves without holding. The dust discharge chute 14 further comprises a top wall 14a and two side walls 14b, and an open bottom 14c. They have a dust plate 17 underneath and partially closing the open bottom 14c so the dust is allowed to come out only at the end.

The dust curtain 16 is for allowing the dust to blow straight down along side the feeder house shields on both sides. It is preferably made of a material called Top Gun from an upholstery business, although any suitable material may be used.

The combine dust eliminator 10 further comprises a drive means 50 connected to a power takeoff on the combine. In the preferred embodiment, it is driven by the combine drive chain. The drive means 50 further comprises a belt 32, first pulley 34, and second pulley 36. An idler pulley 38 may also engage the belt 32. The drive means 50 also has a drive plate 30 (which mounts on the drive chain board on the feeder house.) This board and chain is already on all John Deere Combines from 4400 to 9000 series.

Figure 4:
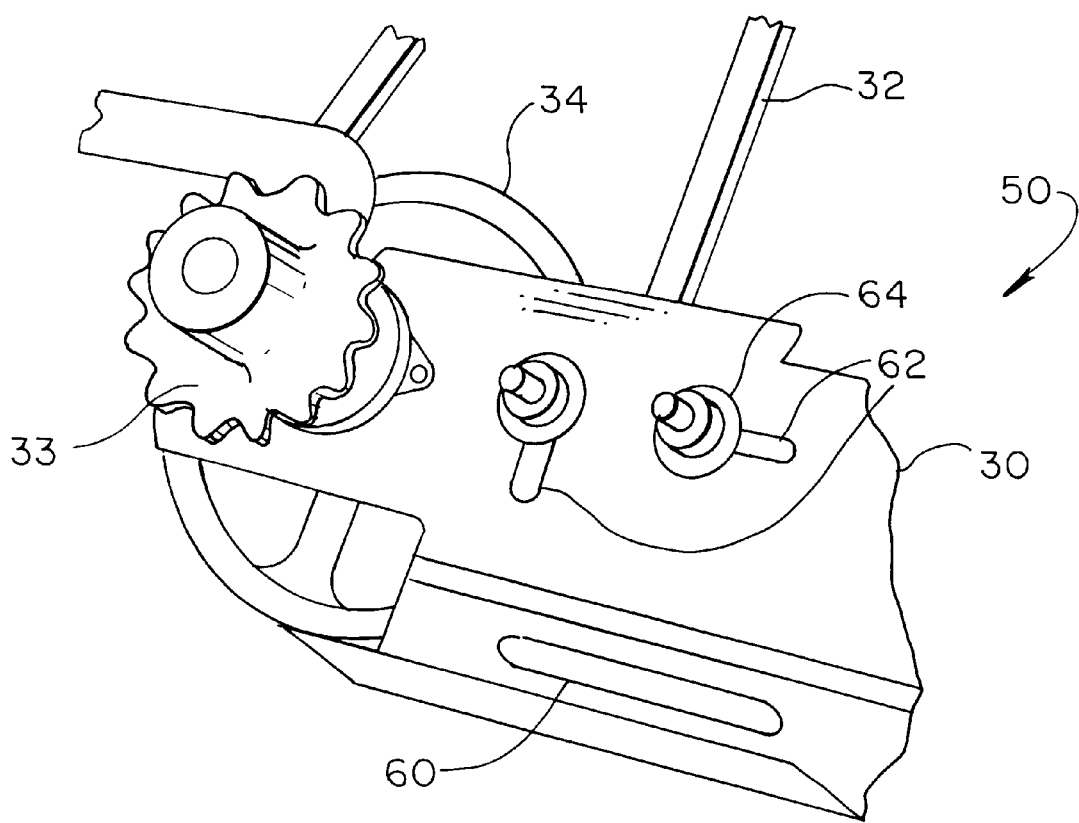
FIG. 4 is a detailed perspective view of the drive mechanism bounded by the dashed lines as shown in FIG. 2.

Construction of the drive means is shown in FIG. 4. The main drive plate 30 is bent at a 90° angle that has a long slot 60 near the bottom for belt adjustment (for a ⅜" hole to drill in the board). On top the long slot is a key stock welded to the plate for the board guard so it will not tilt forward or back. The main plate has two slots 62 on the upper part for the other drive plate to bolt onto. This has a slot going vertical on one and horizontal on the other. This allows for vertical travel when removing the drive sprocket from the chain. Rather than using a half moon type adjustment slot, (easier for the manufacturer) the rear drive plate has square holds for carriage bolts 64 to go through to bolt to main drive plate. This plate also has holes for the drive bearings and shaft. (⅝" shaft as on prints.) This shaft has a keyway on each end for a sprocket 33 on one side and pulley 34 on the other. The pulley 34 is a 6 inch A pulley cast Iron. The combine drive chain and sprocket 33 run on top of the chain board as shown in FIG. 2. Using top board always on all models. The belt 32 is placed on the lower 6" pulley 34 and upper 2½" pulley 36. This allows the fan unit 22 to operate at approximately 1800 RPM at the lowest feeder house speed as for the cutting platform. (Wheat, soybeans, etc.) Not corn. There are two size belts required. One will be a 54" and one a 56". This depends on which model is requested.

This unit discharges dust from both sides as dust discharge chute 14 are the same on both sides. The dust eliminator 10 further comprises a non-skid 38 on top of the dust eliminator housing 12, as the operator may walk on the unit for cleaning the windshield. It has a weather strip underneath for maximum suction. Each fan 22 sucks individually out of each hole P for maximum performance. They do not fight against each other as the two baffles 40 separate them. This unit is designed to remove all the dust from the feeder house and has proven to do so on thousands of acres of wheat and soybeans. This is not recommended for corn, as it such too many leaves through the fans. Corn is not a concern, as you need not run on the ground.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A combine dust eliminator for attachment to the feeder housing of a combine, comprising:
   (a) an elongate dust eliminator housing adapted to be attached to the feeder housing of a combine;
   (b) a plurality of dust discharge chutes attached to the dust eliminator housing;
   (c) a rotating shaft mounted within the dust eliminator housing, the rotating shaft being driven by the combine;
   (d) drive means connected to a power takeoff on the combine for driving the rotating shaft; and
   (e) a pair of fans, one of said fans attached to each end of the rotating shaft.

2. The combine dust eliminator of claim 1, wherein each of the dust discharge chutes is swingably mounted to the dust eliminator housing, whereby each dust discharge chute may be swung upwardly towards the dust eliminator housing to allow access to the interior of the dust eliminator housing.

3. The combine dust eliminator of claim 1, wherein the dust eliminator housing is adapted to be swingably mounted on the feeder housing, whereby the dust eliminator housing may be swung upwardly and forwardly to allow access to the feeder housing.

4. The combine dust eliminator of claim 3, further comprising a plurality of locking devices adapted to hold the dust eliminator housing in contact with the feeder housing.

5. The combine dust eliminator of claim 1, wherein the plurality of dust discharge chutes further comprises a pair of dust discharge chutes, one of said chutes being mounted at each end of the dust eliminator housing, each of said dust discharge chutes having a dust curtain.

6. The combine dust eliminator of claim 5, wherein each dust discharge chute further comprises a top wall and two side walls, the bottom of each dust discharge chute being open and further comprising a dust plate partially closing the open bottom, whereby dust is prevented from exiting the dust discharge chute until the dust reaches the dust curtain.

7. The combine dust eliminator of claim 1, wherein the dust eliminator housing is adapted to be mounted on the feeder housing substantially transverse to the direction of motion of the combine.

8. The combine dust eliminator of claim 7, wherein the dust eliminator housing has a first end and a second end, and the rotating shaft is mounted between the first end and the second end.

9. The combine dust eliminator of claim 1, further comprising a plurality of baffles within the dust eliminator housing, the plurality of baffles separating the respective air flows of the pair of fans.

10. The combine dust eliminator of claim 9, wherein the plurality of baffles further comprises a pair of baffles each baffle mounted inwardly from one of the rotating fans, and wherein each baffle further comprises a first portion adapted to extend from the feeder housing upwardly for approximately half the depth of the dust eliminator housing, and a second portion connected to the first portion and angled outwardly at about a 45 degree angle to an axis of the dust eliminator housing.

11. The combine dust eliminator of claim 1, the dust eliminator housing further comprising a top surface and having a non-skid surface attached to the top surface to allow an operator to stand on the dust eliminator housing.

12. The combine dust eliminator of claim 1, further comprising a seal adapted to seal the dust eliminator housing and the feeder housing.

13. The combine dust eliminator of claim 1, wherein the pair of fans comprises a first fan having a left blade pitch and a second fan having a right blade pitch, whereby rotation of the fans on the rotating shaft moves air in opposed directions.

14. The combine dust eliminator of claim 1, further comprising a downwardly hanging dust curtain attached to each dust discharge chute.

15. The combine dust eliminator of claim 1, wherein the drive means further comprises a sprocket engaging the combine drive chain, a first pulley driven by the sprocket, a second pulley attached to the rotating shaft, a belt engaging the first pulley and the second pulley, and an idler pulley engaging the belt.

16. A combine dust eliminator for attachment to the feeder housing of a combine, the combine having a drive chain comprising:
  (a) an elongate dust eliminator housing adapted to be attached to the feeder housing of a combine;
  (b) a plurality of dust discharge chutes attached to the dust eliminator housing;
  (c) a rotating shaft mounted within the dust eliminator housing, the rotating shaft being driven by the combine;
  (d) drive means adapted to be connected to a power takeoff on the combine for driving the rotating shaft, wherein the drive means further comprises a sprocket adapted to engage the combine drive chain, a first pulley driven by the sprocket, a second pulley attached to the rotating shaft, a belt engaging the first pulley and the second pulley, and an idler pulley engaging the belt; and
  (e) a pair of fans, one of said fans attached to each end of the rotating shaft.

17. The combine dust eliminator of claim 16, wherein the pair of fans comprises a first fan having a left blade pitch and a second fan having a right blade pitch, whereby rotation of the fans on the rotating shaft moves air in opposed directions.

18. A drive mechanism attachable to the drive chain of a combine having a feeder housing, for driving external devices such as dust eliminator fans, the drive mechanism comprising:
  (a) a combine drive chain;
  (b) a sprocket engaging the combine drive chain and driven thereby;
  (c) a first pulley driven by the sprocket;
  (d) a second pulley adapted to drive the external device;
  (e) a belt engaging the first pulley and second pulley;
  (f) an idler pulley engaging the belt;
  (g) a rotating shaft driven by the second pulley; and
  (h) a pair of rotating fans driven by the rotating shaft, for blowing dust away from the combine feeder housing.

* * * * *